(12) United States Patent
Fischer et al.

(10) Patent No.: US 10,621,388 B2
(45) Date of Patent: Apr. 14, 2020

(54) AUTOMATIC DELTA QUERY SUPPORT FOR BACKEND DATABASES

(71) Applicant: SAP SE, Walldorf (DE)

(72) Inventors: Andre Fischer, Walldorf (DE); Matthias De la Roche, Neulussheim (DE)

(73) Assignee: SAP SE, Walldorf (DE)

( * ) Notice: Subject to any disclaimer, the term of this patent is extended or adjusted under 35 U.S.C. 154(b) by 892 days.

(21) Appl. No.: 15/214,692

(22) Filed: Jul. 20, 2016

(65) Prior Publication Data
US 2018/0025042 A1   Jan. 25, 2018

(51) Int. Cl.
*G06F 16/00* (2019.01)
*G06F 40/169* (2020.01)
*G06F 16/2455* (2019.01)
*G06F 16/2457* (2019.01)

(52) U.S. Cl.
CPC ........ *G06F 40/169* (2020.01); *G06F 16/2455* (2019.01); *G06F 16/24573* (2019.01)

(58) Field of Classification Search
CPC .................................. G06F 16/24573
USPC ....................................................... 707/625
See application file for complete search history.

(56) References Cited

U.S. PATENT DOCUMENTS

| | | | |
|---|---|---|---|
| 8,005,710 B2* | 8/2011 | Vishnumurty | G06Q 10/063 705/7.11 |
| 2013/0138524 A1* | 5/2013 | Sharma | G06Q 30/0601 705/26.1 |
| 2015/0006710 A1 | 1/2015 | Sauerwald et al. | |
| 2016/0077926 A1* | 3/2016 | Mutalik | G06F 3/0641 711/162 |

* cited by examiner

*Primary Examiner* — Chelcie L Daye
(74) *Attorney, Agent, or Firm* — Fish & Richardson P.C.

(57) ABSTRACT

The present disclosure involves systems, software, and computer implemented methods for automatically providing delta query support for backend databases. One example method includes identifying annotations for a data set. The annotations indicate data fields of the data set to be used for a delta calculation. A request for a delta calculation is received for the data set. A set of delta calculation queries are automatically generated based on the annotations and a set of query templates in response to the request for the delta calculation. The set of delta calculation queries are executed to generate a delta calculation result. The automatically generated delta calculation result is provided in response to the request for the delta calculation.

20 Claims, 10 Drawing Sheets

| Property | Key Field | is_created_token | is_changed_token | is_deleted |
|---|---|---|---|---|
| | 402 | 404 | 408 | 412 | 416 |
| ProductId | X  *406* | | | |
| Name | | | | |
| Price | | | | |
| ... | | | | |
| Created_at | | True *410* | | |
| Changed_at | | | True *414* | |
| isDeleted | | | | true *418* |

*400*

| Property | Key Field | is_created_token | is_changed_token | is_deleted |
|---|---|---|---|---|
| ProductId | X *406* | | | |
| Name | | | | |
| Price | | | | |
| ... | | True *410* | | |
| Created_at | | | True *414* | |
| Changed_at | | | | |
| isDeleted | | | | true *418* |

| ProductID | Name | ChangedAt | CreatedAt | isDeleted |
|---|---|---|---|---|
| 0100 | HT-1000 | 04.01.2017 20:15:00 | 02.01.2017 20:15:00 | |
| 0101 | HT-1002 | 05.01.2017 20:25:00 | 05.01.2017 20:25:00 | |
| 0102 | HT-1003 | 05.01.2017 20:55:00 | 05.01.2017 20:55:00 | |
| 0103 | HT-1010 | 05.01.2017 21:15:00 | 05.01.2017 21:15:00 | |
| 0104 | HT-1011 | 05.01.2017 22:15:00 | 05.01.2017 22:15:00 | |

FIG. 6

| ProductID | Name | ChangedAt | CreatedAt | isDeleted |
|---|---|---|---|---|
| 0100 | HT-1000 | 04.01.2017 20:15:00 | 02.01.2017 20:15:00 | |
| 0101 | HT-1002 | 08.01.2017 10:15:00 _720_ | 05.01.2017 20:25:00 | X _718_ |
| 0102 | HT-1003 | 08.01.2017 09:15:00 _712_ | 05.01.2017 20:55:00 | |
| 0103 | HT-1010 | 05.01.2017 21:15:00 | 05.01.2017 21:15:00 | |
| 0104 | HT-1011 | 05.01.2017 22:15:00 | 05.01.2017 22:15:00 | |
| 0105 | HT-1020 | 08.01.2017 14:15:00 | 07.01.2017 13:15:00 _706_ | |
| 0106 | HT-1030 | 08.01.2017 22:15:00 | 08.01.2017 22:15:00 _708_ | |

FIG. 7

AUTOMATIC DELTA QUERY SUPPORT FOR BACKEND DATABASES

TECHNICAL FIELD

The present disclosure relates to computer-implemented methods, software, and systems for automatically providing delta query support for backend databases.

BACKGROUND

A mobile application can run on a mobile device. The mobile application can be configured to communicate with a server. For example, the server can manage or otherwise be associated with a central database that stores data that is used by multiple instances of the mobile application. The mobile application can communicate with the server to receive data from the central database and to provide information to the server for storage in the central database. The mobile application can be configured to operate in an offline mode. For example, the server can provide a local database that is stored on the mobile device and used by the mobile application when the mobile device is offline.

SUMMARY

The present disclosure describes methods and systems, including computer-implemented methods, computer program products, and computer systems for automatically providing delta query support for backend databases.

In an implementation, annotations for a data set are identified. The annotations indicate data fields of the data set to be used for a delta calculation. A request for a delta calculation is received for the data set. A set of delta calculation queries are automatically generated based on the annotations and a set of query templates in response to the request for the delta calculation. The set of delta calculation queries are executed to generate a delta calculation result. The automatically generated delta calculation result is provided in response to the request for the delta calculation.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 illustrates an example annotated view definition for a product view.

FIG. 6 illustrates an example annotated product table.

FIG. 7 illustrates an example modified annotated product table.

DETAILED DESCRIPTION

Figure 1:
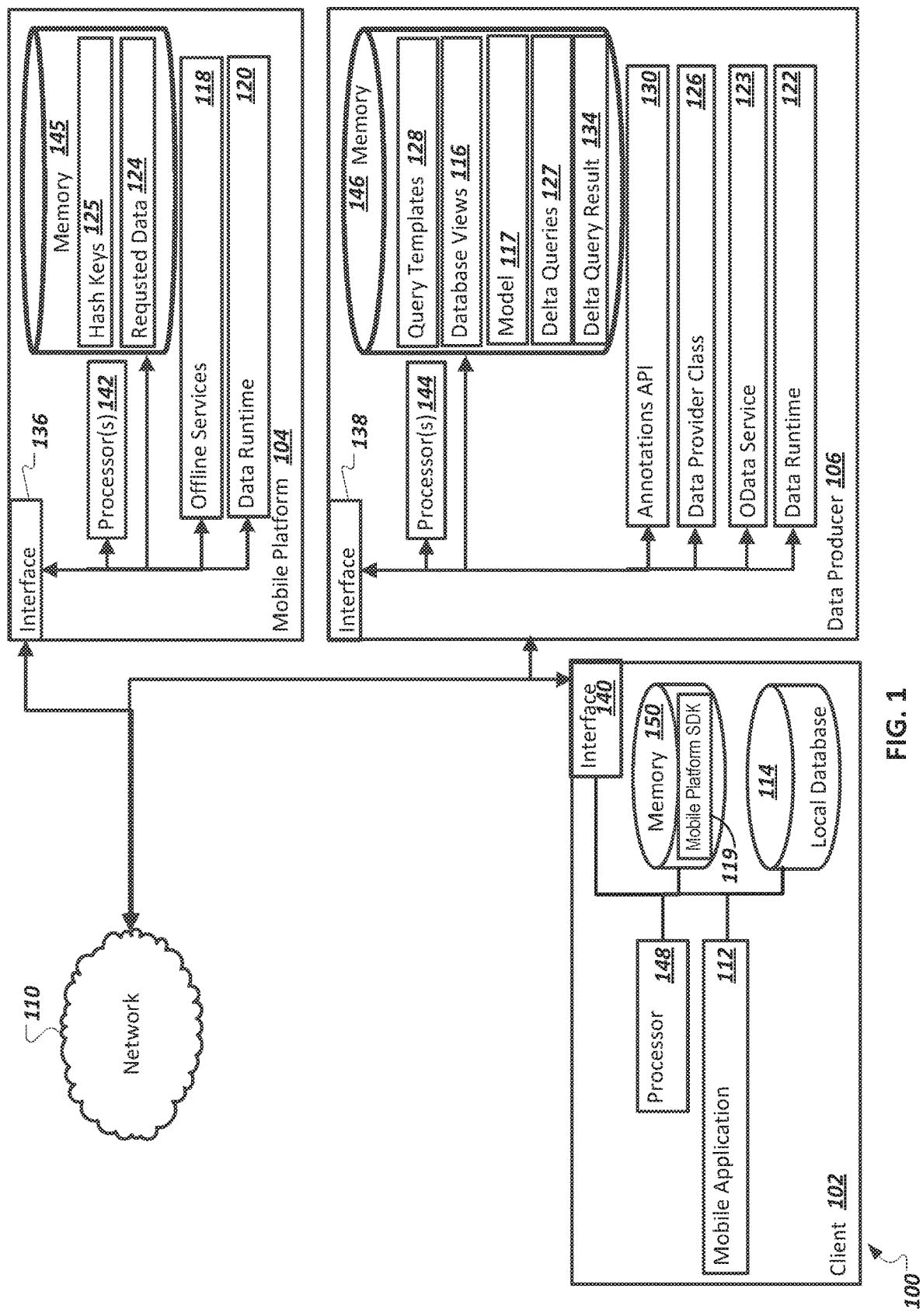
FIG. 1 is a block diagram illustrating an example system for automatically providing delta query support for backend databases.

A mobile (or other type of) application can be configured to use a local database that is stored on a same device on which the application is executed. The local database can be initially populated with data from a server, for example. The local database can be periodically synchronized with a server database. The application can be configured to execute in an offline mode when the device is not connected to a network. When the device comes back online, the local database can be synchronized with the server database. To facilitate local and server database synchronization, delta query support can be added to data sets (e.g., database tables and views) that are provided by data providers. A standard implementation of delta query support can be added to a generic class and can be automatically provided or made available to data sets through inheritance.

The use of the generic class can provide out of the box support for delta queries for multiple data entities. In some implementations, a data service (e.g., an OData service) is based on a database view. The database view can be annotated to indicate that delta query support is enabled. For example, an annotation of "delta-query-support=true" can be associated with the database view. Other annotations can be added to the database view that indicate when the data associated with the database view was last changed or deleted. For example, the database view may have a timestamp property that stores a last change time. The timestamp property can be annotated with annotation such as "delta-token=true". As another example, the database view may include a property that indicates whether an entity instance has been marked as inactive, closed, or deleted. In some implementations and for some data sets, entities are marked as inactive rather than permanently deleted, such as for auditing purposes. The property that indicates whether an entity instance is inactive can be annotated with an annotation such as "delta-query-active=true". A generic data provider class that is used by multiple database views can be configured to generate queries that use annotations such as the delta-token and delta-query-active annotations. The data provider class can provide query templates and can populate/fill in the query templates for a particular database view by identifying which fields in the database view have been annotated. The filled-in query template can be executed to identify changed, newly created and deleted items since a last data refresh time.

Automatically providing delta query support can save development time as compared to custom coding to provide delta queries for each of multiple data sets. Delta query support can be provided in a standardized way, which can provide consistency and less maintenance and support as compared to multiple, disparate custom implementations. Providing delta query support to multiple data sets can result in a reduction in the size of transferred data in a mobile application infrastructure. A data producer can be configured to determine a minimal amount of data to transfer in response to a delta query request.

Enabling delta calculation in a backend system can minimize the amount of data being transferred over a network, thus saving bandwidth and providing better performance for areas with low network speeds. Performing a calculation of deltas at the source and not in a separate system can save processing time and reduce storage requirements, due to removing a need to store information in an extra system. In a cloud environment, lower operating costs can be achieved due to less use of processing, storage, and network bandwidth.

FIG. 1 is a block diagram illustrating an example system 100 for automatically providing delta query support for backend databases. Specifically, the illustrated environment 100 includes or is communicably coupled with a client 102, a mobile platform server 104, a data producer 106, and a network 110. Although a single data producer 106 is shown, multiple data producers can be included in the system 100.

A mobile application 112 executes on the client 102. The mobile application 112 can be configured to use a local database 114. The local database 114 can include data that is a copy of data provided by the data producer 106. For example, the local database 114 can include data associated with database views 116 that are provided by the data producer 106. The database views 116 can be associated with a data model 117.

In some implementations, the mobile application 112 requests data for the local database 114 so that the mobile application 112 can operate in an offline mode. The mobile application 112 can send a request for an initial download of the local database 114 to an offline services component 118 included in the mobile platform server 104. The mobile application 112 can be configured to communicate with the mobile platform server 104 using a mobile platform SDK (Software Development Kit) 119.

A data runtime 120 in the mobile platform server 104 can communicate with a backend data runtime 122 in the data producer 106 to request data for the database views 116 that are associated with the mobile application 112. Although database views 116 are described, data for other types of data sets, such as database tables, can be requested. Data for the database views 116 can be provided by an OData service 123 (or, in some implementations, by multiple OData services). The offline services component 118 can receive data for the database views 116 for temporary storage in requested data 124. The offline services component 118 can create a database for the mobile application 112 using the requested data 124 and can send the created database to the client 102 to be stored as the local database 114.

The data runtime 120 can determine whether the data producer 106 is delta-enabled. For example, the data producer 106 can be delta-enabled for a database view 116 if the database view 116 includes an annotation such as "delta-query-support=true." The data producer 106 is delta-enabled if the data producer 106 is able to determine a subset of data that has last changed or that has been deleted since a previous data refresh request (or since an initial download). If the data producer 106 is not delta-enabled, the offline services component 118 determines and caches a hash key for each record received from the data producer 106 and stores hash keys 125. If the data producer 106 is delta-enabled, the hash keys 125 do not need to be calculated or stored. The hash keys 125 can be used by the offline services component 118 when responding to a subsequent data refresh request from the client 102, if the data producer 106 is not delta-enabled.

For example, the mobile application 112 can use the local database 114 while in an offline mode, and can make changes (e.g., additions, modifications, deletions) to data included in the local database 114. As another example, while the mobile application 112 is offline, other users or system processes can make changes to the database views 116 that are associated with the mobile application 112. When the mobile application 112 comes back online, the mobile application 112 can send a data refresh request to the offline services component 118. The data refresh request can include indications of data that have been added to, changed in, or deleted from the local database 114 by the mobile application 112.

In response to the data refresh request, the data runtime 120 can send a data request to the backend data runtime 122. If the offline services component 118 determines that the data producer 106 is not delta-enabled, the offline services component 118 can receive a full set of data associated with the database views 116. The offline services component 118 can retrieve the stored hash keys 125 and determine a delta query result using the retrieved hash keys 125 and the indications of changed, added, and deleted data included in the data refresh request received from the mobile application 112. For example, the offline services component 118 can determine added, changed, and deleted records in the full data set based on the retrieved hash keys 125 and the indications of changed, added, and deleted data. Receiving the full set of data instead of a delta amount of data results in more processing time for the data receiving and hash calculation, and greater storage requirements, as compared to a delta-enabled scenario.

If the offline services component 118 determines that the data producer 106 is delta-enabled, the offline services component 118 can send a delta query request to the data producer 106. The delta query request can indicate (e.g., in a delta token, which may be a timestamp) when a last data request was sent to the data producer 106. The data producer 106 can generate and send a delta query result to the offline services component 118. A delta query result, whether generated by the data producer 106 or the offline services component 118, can be sent to the client 102, for updating the local database 114. That is, the client 102 receives the same set of data regardless of whether the data producer 106 is delta-enabled. However, the delta-enabled scenario saves processing time and data storage requirements.

For the data producer 106 to be delta-enabled, the OData service 106 which provides data for the database views 116 can be associated with a data provider class 126 that has been configured to provide delta support. The data provider class 126 can be a generic class that can be associated with and provide delta-query support for multiple OData services 123 and database views 116. The data provider class 126 can be configured to provide a set of query templates 128 that can be modified for a particular OData service 123 and used to create delta queries 127 that can return a delta query result for a data refresh request for the database views 116 that are associated with the OData service 123.

As described in more detail below, a query template 128 can include placeholders that are replaced with query parameters that are based on annotations associated with a particular database view 116. Annotations can be added to a database view 116 to indicate, for example, database fields that can be used to determine when data in the database view 116 has been changed, added, or deleted.

The data provider class 126 can use an annotations API (Application Programming Interface) 130 to identify and evaluate the annotations included in the database view 116. The data provider class 126 can identify database fields that have been annotated and can replace the placeholders included in the query templates 128 with the identified database fields, to generate delta queries 127. The delta queries 127 can be executed to generate a delta query result 134. The delta query result 134 can be provided to the offline services component 118 as requested data 124 and provided to the mobile application 112.

The delta query support provided by the data provider class 126 can be provided to other database views 116 used by other applications, or to new, subsequently-created database views 116. A new or other database view 116 can be modified to include annotations, for example. As mentioned above, providing delta query support using a common, shared data provider class 126 and annotated database views 116 can result in standardized, reusable, more easily implemented, and more maintainable code as compared to custom development individually implemented for multiple database views 116.

As used in the present disclosure, the term "computer" is intended to encompass any suitable processing device. For example, although FIG. 1 illustrates a single mobile platform server 104, a single client 102, and a single data producer 106, the system 100 can be implemented using two or more mobile platform servers 104, two or more data producers 106, or two or more clients 102. Indeed, the mobile platform server 104, the data producer 106, and the client 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the mobile platform server 104, the data producer 106, and the client 102 may be adapted to execute any operating system, including Linux, UNIX, Windows, Mac OS®, Java™, Android™, iOS or any other suitable operating system. According to one implementation, the mobile platform server 104 may also include or be communicably coupled with an e-mail server, a Web server, a caching server, a streaming data server, and/or other suitable server.

Interfaces 136, 138, and 140 are used by the mobile platform server 104, the data producer 106, and the client 102, respectively, for communicating with other systems in a distributed environment—including within the system 100—connected to the network 110. Generally, the interfaces 136, 138, and 140 each comprise logic encoded in software and/or hardware in a suitable combination and operable to communicate with the network 110. More specifically, the interfaces 136, 138, and 140 may each comprise software supporting one or more communication protocols associated with communications such that the network 110 or interface's hardware is operable to communicate physical signals within and outside of the illustrated system 100.

The mobile platform server 104 includes one or more processors 142 and the data producer 106 includes one or more processors 144. Each processor 142 or 144 may be a central processing unit (CPU), a blade, an application specific integrated circuit (ASIC), a field-programmable gate array (FPGA), or another suitable component. Generally, each processor 142 or 144 executes instructions and manipulates data to perform the operations of the mobile platform server 104 or data producer 106, respectively. Each processor 142 executes the functionality required to receive and respond to requests from the client 102, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The mobile platform server 104 includes memory 145 and the data producer 106 includes memory 146. In some implementations, the mobile platform server 104 and/or the data producer 106 include multiple memories. Each of the memory 145 and 146 may include any type of memory or database module and may take the form of volatile and/or non-volatile memory including, without limitation, magnetic media, optical media, random access memory (RAM), read-only memory (ROM), removable media, or any other suitable local or remote memory component. Each of the memory 145 or 146 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the mobile platform server 104 or the data producer 106, respectively.

The client 102 may generally be any computing device operable to connect to or communicate with the mobile platform server 104 via the network 110 using a wireline or wireless connection. In general, the client 102 comprises an electronic computer device operable to receive, transmit, process, and store any appropriate data associated with the system 100 of FIG. 1. The client 102 can include one or more client applications, including the mobile application 112. A client application is any type of application that allows the client 102 to request and view content on the client 102. In some implementations, a client application can use parameters, metadata, and other information received at launch to access a particular set of data from the mobile platform server 104. In some instances, a client application may be an agent or client-side version of the one or more enterprise applications running on an enterprise server (not shown).

The client 102 further includes one or more processors 148. Each processor 148 included in the client 102 may be a central processing unit (CPU), an application specific integrated circuit (ASIC), a field-programmable gate array (FPGA), or another suitable component. Generally, each processor 148 included in the client 102 executes instructions and manipulates data to perform the operations of the client 102. Specifically, each processor 148 included in the client 102 executes the functionality required to send requests to the mobile platform server 104 and to receive and process responses from the mobile platform server 104.

The client 102 is generally intended to encompass any client computing device such as a laptop/notebook computer, wireless data port, smart phone, personal data assistant (PDA), tablet computing device, one or more processors within these devices, or any other suitable processing device. For example, the client 102 may comprise a computer that includes an input device, such as a keypad, touch screen, or other device that can accept user information, and an output device that conveys information associated with the operation of the mobile platform server 102, or the client 102 itself, including digital data, visual information, or a GUI (Graphical User Interface).

The GUI of the client 102 interfaces with at least a portion of the system 100 for any suitable purpose, including generating a visual representation of the mobile application 112. In particular, the GUI may be used to view and navigate various Web pages. Generally, the GUI provides the user with an efficient and user-friendly presentation of business data provided by or communicated within the system. The GUI may comprise a plurality of customizable frames or views having interactive fields, pull-down lists, and buttons operated by the user. The GUI contemplates any suitable graphical user interface, such as a combination of a generic web browser, intelligent engine, and command line interface (CLI) that processes information and efficiently presents the results to the user visually.

Memory 150 included in the client 102 may include any memory or database module and may take the form of volatile or non-volatile memory including, without limitation, magnetic media, optical media, random access memory (RAM), read-only memory (ROM), removable media, or any other suitable local or remote memory component. The memory 150 may store various objects or data, including user selections, caches, classes, frameworks, applications, backup data, business objects, jobs, web pages, web page templates, database tables, parameters, repositories storing business and/or dynamic information, and any other appropriate information including any parameters, variables, algorithms, instructions, rules, constraints, or references thereto associated with the purposes of the client 102.

There may be any number of client devices 102 associated with, or external to, the system 100. For example, while the illustrated system 100 includes one client 102, alternative implementations of the system 100 may include multiple client devices 102 communicably coupled to the mobile platform server 104 and/or the network 110, or any other number suitable to the purposes of the system 100. Additionally, there may also be one or more additional client devices 102 external to the illustrated portion of system 100 that are capable of interacting with the system 100 via the network 110. Further, the term "client", "client device" and "user" may be used interchangeably as appropriate without departing from the scope of this disclosure. Moreover, while the client 102 is described in terms of being used by a single user, this disclosure contemplates that many users may use one computer, or that one user may use multiple computers.

Figure 2:
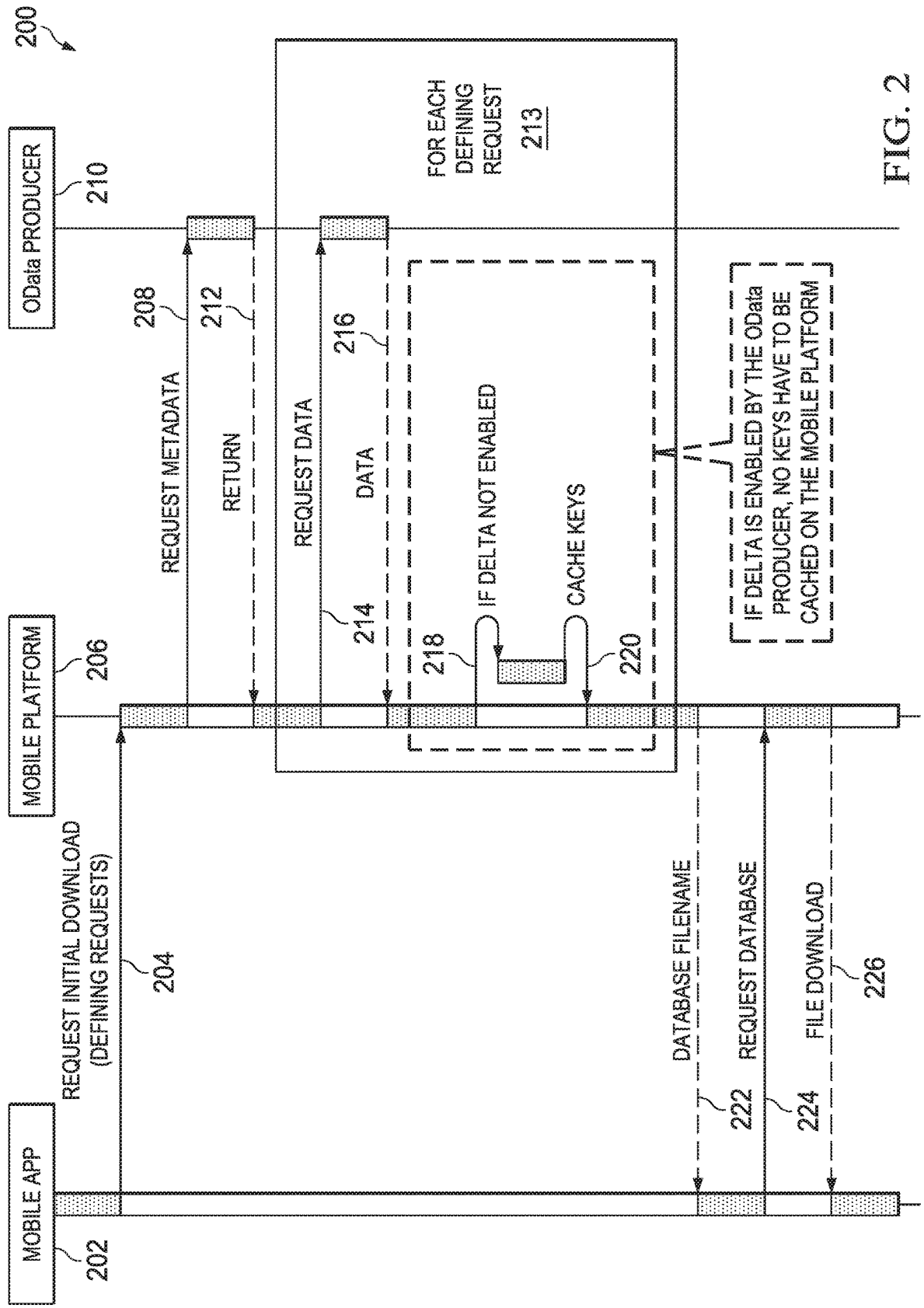
FIG. 2 is a flowchart of an example method for providing an initial database download.

FIG. 2 is a flowchart of an example method 200 for providing an initial database download. A mobile application 202 sends a request 204 for an initial download of a database to be used by the mobile application 202 to a mobile platform 206. The database can be used by the mobile application 202, for example, when the mobile application 202 is in an online or offline mode. The request 204 for the initial download can include an indication of one or more requested data sets (e.g., tables, views). The requested data sets can be referred to as a set of defining requests. The mobile platform 206 sends a request 208 for metadata to an OData producer 210. The OData producer 210 returns the requested metadata 212. The metadata 212 can describe the data sets requested in the request 204.

For each requested data set (e.g., each defining request), a set of operations in processing block 213 can be performed. The mobile platform 206 sends a data request 214 to the OData producer 210 for a particular data set. A given data request 214 can include metadata from the requested metadata 212 that describes the particular data set. The OData producer 210 returns requested data 216 for the particular data set to the mobile platform 206 in response to the data request 214.

The mobile platform 206 determines whether the OData producer 210 is delta-enabled (e.g., is capable of performing a delta calculation). If the OData producer 210 is not delta-enabled (e.g., as illustrated by arrow 218), the mobile platform 206 determines and caches a hash key for each record in the requested data 216 (e.g., as illustrated by arrow 220). If the OData producer 210 is delta-enabled, the mobile platform 206 does not have to determine hash keys for the requested data 216. In some implementations, if the OData producer 210 is delta-enabled, the mobile platform 206 stores a delta token that indicates a time of the initial download. The delta token can be included in a subsequent data refresh request as described below with respect to FIG. 3.

The mobile platform 206 creates a database file based on the received requested data 216 and provides a database filename 222 to the mobile application 202. The mobile application 202 sends a database request 224 that includes the database filename 222 to the mobile platform 206. The mobile platform 206 sends the requested database 224 to the mobile application 202.

Although an OData producer 210 is shown, other types of data providers can be used. Although one OData producer 210 is shown, in some implementations, the mobile platform 206 sends different requests to different data providers for different data sets.

Figure 3:
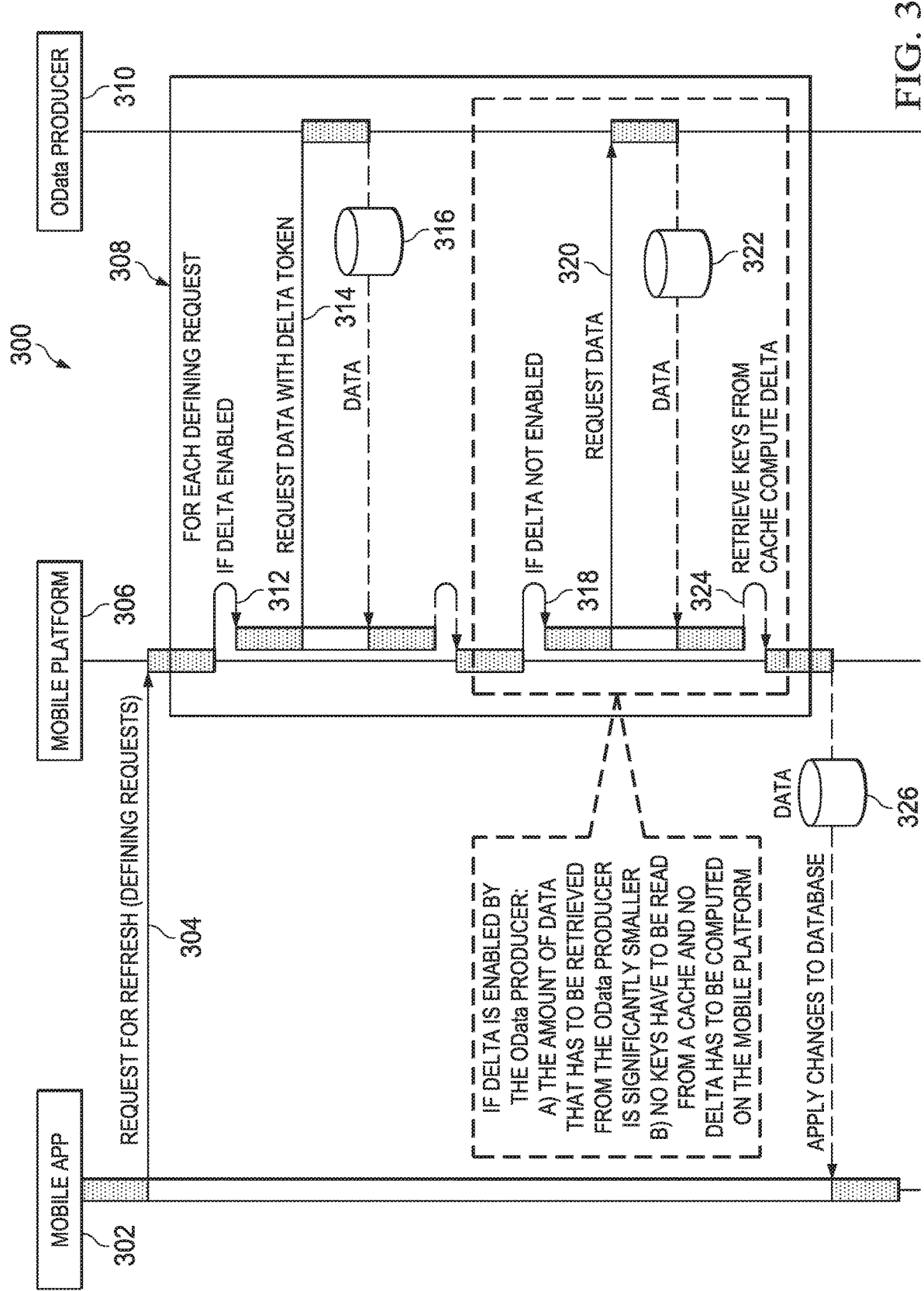
FIG. 3 is a flowchart of an example method for performing a delta calculation.

FIG. 3 is a flowchart of an example method 300 for performing a delta calculation. A mobile application 302 sends a request 304 for a database refresh for a set of data sets to a mobile platform 306. The mobile application 302 may now be online after having been offline, for example. For each requested data set (e.g., each defining request), a set of operations in a processing block 308 can be performed, the specific operations depending on whether the OData producer 310 is delta-enabled or not.

During the operations of processing block 308, the mobile platform 306 determines whether the OData producer 310 is delta-enabled (e.g., is capable of performing a delta calculation). In some implementations, the determination of whether the OData producer 310 is delta-enabled is performed once in response to the request 304. In other implementations, a determination is made for each defining request as to whether the OData producer 310 is delta-enabled with respect to a respective defining request. If the OData producer 310 is delta-enabled (e.g., as illustrated by arrow 312), the mobile platform 306 sends a data request 314 with a delta token (e.g., a timestamp) to the OData producer 310. The delta token indicates or references a time at which a last data request was received by the OData producer 310. The OData producer produces a delta query result 316 (e.g., using annotations and query templates, as described herein) providing updated information since the time at which the last data request was received, and sends the delta query result 316 to the mobile platform 306.

If the OData producer is not delta-enabled (e.g., as illustrated by arrow 318), the mobile platform 306 sends a data request 320 to the OData producer for a full data set associated with the respective defining request. The OData producer 310 returns the requested full data set 322 to the mobile platform 306. As indicated by arrow 324, the mobile platform 306 can retrieve the stored hash keys 125 and determine a delta query result using the retrieved hash keys (e.g., by determining added, changed, and deleted records in the full data set based on the retrieved hash keys). A delta query result 326, whether generated by the OData producer 310 or the mobile platform 306, is sent to the mobile application 302, in response to the request 304.

As mentioned above, implementing delta-query support in the OData producer 310, e.g., using a common data provider class, can result in less data being transferred between the OData producer 310 and the mobile platform 306 (e.g., as illustrated by the smaller-sized delta query result 316 as compared to the larger-sized full data set 322). Additionally, storage size and processing time are reduced when the OData producer 310 is delta-enabled since hash keys do not need to be calculated. Although an OData producer 310 is shown, other types of data providers can be used. Although one OData producer 310 is shown, in some implementations, the mobile platform 306 sends different requests to different data providers for different data sets.

FIG. 4 illustrates an example annotated view definition 400 for a product view. In some implementations, the definition 400 is for a table rather than a view. The annotated view definition 400 includes a column 402 that includes column names for the product view, including ProductId, Name, Price, Created_at, Changed_at, and isDeleted columns. A keyfield column 404 includes an indicator 406 that indicates that the ProductId column is a key field for the product view.

An "is_created_token" column 408 includes an annotation 410 that indicates that the Created_at column can be used to identify when a record of the product view has been created. An "is_changed_token" column 412 includes an annotation 414 that indicates that the Changed_at column can be used to identify when a record of the product view has been changed. An "is_deleted" column 416 includes an annotation 418 that indicates that the isDeleted column can be used to identify that a record of product view has been deleted. As described in more detail below, the annotations 410, 414, and 418 can be used to perform a delta calculation. For example, a service implementation that retrieves updated data can be generated based on the annotations 410, 414, and 418.

Figure 5:
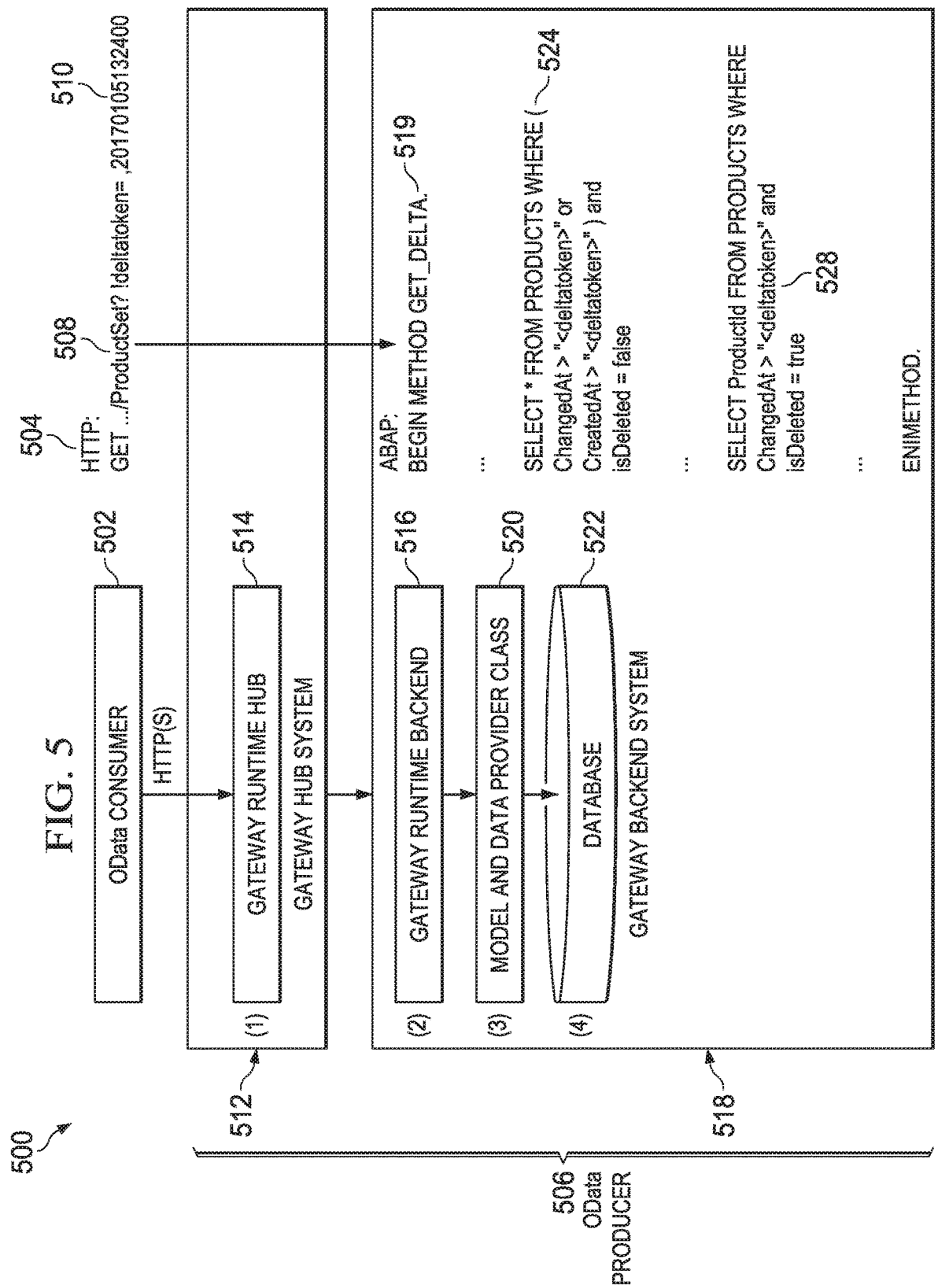
FIG. 5 illustrates an example system for performing a delta calculation.

FIG. 5 illustrates an example system 500 for performing a delta calculation. An OData consumer 502 (e.g., the mobile platform 306 described above with respect to FIG. 3) can send a refresh request 504 (e.g., a request for updated data) to an OData producer 506. The refresh request 504 includes an indication 508 of which data set to refresh (e.g., a data set related to products) and a delta token 510 which indicates a last date/time at which the OData consumer received data from the OData producer 506. In some implementations, the refresh request 504 is an HTTP GET command. The OData producer 506 can be associated with an OData service published by a gateway runtime hub system 512. Although OData producers and services are described, other types of data providers can be used.

The refresh request 504 can be received by a gateway runtime hub 514 included in the gateway hub system 512 (1) and forwarded to a gateway runtime backend 516 in a gateway backend system 518. The gateway runtime backend 516 can recognize that the refresh request 504 is a refresh request (2) and invoke a get-delta method 519 in a model and data provider class 520 associated with the requested data set (3). The get-delta method 519 can include a service implementation that retrieves database information from a database 522 (4).

The model and data provider class 520 can perform the get-delta method 519 in response to the refresh request 504. The get-delta method 519 includes a find-changed-or-added-records query 524 of "Select*from Products where (ChangedAt>'<deltatoken>' or CreatedAt> '<deltatoken>') and isDeleted=false". The "ChangedAt", "CreatedAt", and "isDeleted" labels in the find-changed-or-added-records query 524 can be identified based on the is_created_token 410, is_changed_token 414 and is_deleted 418 annotations included in the view definition 400 described above with respect to FIG. 4, respectively. The find-changed-or-added-records query 524 can be performed to retrieve product records from the database 526 that have been changed or added (and not subsequently deleted) since the date/time represented by the delta token 510.

The get-delta method 519 includes a find-deleted-records query 528 of "Select ProductId from Products where ChangedAt>'<deltatoken>' and isDeleted=true". The find-deleted-records query 526 can be performed to identify product records that have been deleted since the date/time represented by the delta token 510. Before the queries 524 and 528 are performed, '<deltatoken>' references can be replaced with the delta token 510.

The results from the find-changed-or-added-records query 524 and the find deleted-records query 528 can be returned to the OData consumer as a delta calculation result. The delta calculation result can be sent to a mobile device, for example, to update a local database on the mobile device. The results from the find-changed-or-added-records query 524 and the find-deleted-records query 528 are generally much smaller than the full data set, since those queries return only information changed, added, or deleted since the time associated with the delta token.

FIG. 6 illustrates an example annotated product table 600. The annotated product table 600, which can be associated with the product view definition 400 described above with respect to FIG. 4, includes rows 602-610, and for each row 602-610, values for ProductId 612, Name 614, ChangedAt 616, CreatedAt 618, and isDeleted 620 columns. The example annotated product table 600 includes data as of Jan. 6, 2017. The ChangedAt column 616, which corresponds to the annotation 414 of FIG. 4, includes a value, for a given row, that indicates when the row was last changed. The CreatedAt column 618, which corresponds to the annotation 410 of FIG. 4, includes a value, for a given row, that indicates when the row was created. The isDeleted column 620, which corresponds to the annotation 418 of FIG. 4, includes a value, for a given row, that indicates whether the row has been deleted.

FIG. 7 illustrates an example modified annotated product table 700. The modified annotated product table 700 includes changes that have occurred to the product table since Jan. 6, 2017. Rows 702 and 704 have been added since Jan. 6, 2017, as indicated by values 706 and 708 of January 7 and January 8, respectively, in a createdAt column 709. A row 710 has been changed since January 6, as indicated by a value 712 of January 8 in a changedAt column 714. A row 716 has been deleted since January 6, as indicated by a value 718 in an isDeleted column 719 and a value 720 of January 8 in the changedAt column 714. As described in more detail below, a delta calculation can be performed that identifies differences between the modified annotated product table 700 and the annotated product table 600 of FIG. 5.

Figure 8:
FIG. 8 illustrates a query result generated is response to a find-changed-and-added-records query.

FIG. 8 illustrates a query result 802 generated is response to a find-changed-and-added-records query 804. The query 804 corresponds to the changed-or-added-records query 524 described above with respect to FIG. 5 and can be used to find records in a products table (or view) that have been added or changed since a specified date (e.g., Jan. 1, 2017 as specified in the query 804). The query result 802 includes added records 806 and 808 which correspond to the added records 702 and 704 described above with respect to FIG. 7, respectively. The query result 802 includes a modified record 810 which corresponds to the modified record 710 described above with respect to FIG. 7.

Figure 9:
FIG. 9 illustrates a query result generated is response to a find-deleted-records query.

FIG. 9 illustrates a query result 902 generated is response to a find-deleted-records query 904. The query 904 corresponds to the find-deleted-records query 528 described above with respect to FIG. 5 and can be used to find records in a products table (or view) that have been deleted since a specified date (e.g., Jan. 1, 2017 as specified in the query 904). The query result 902 includes a deleted record 906 which corresponds to the deleted record 716 described above with respect to FIG. 7. The deleted record 906 (or in some implementations, an identifier of the deleted record 906) can be sent to a client device to be used by the client device for identifying and deleting a corresponding record stored in a local database on the client device.

Figure 10:
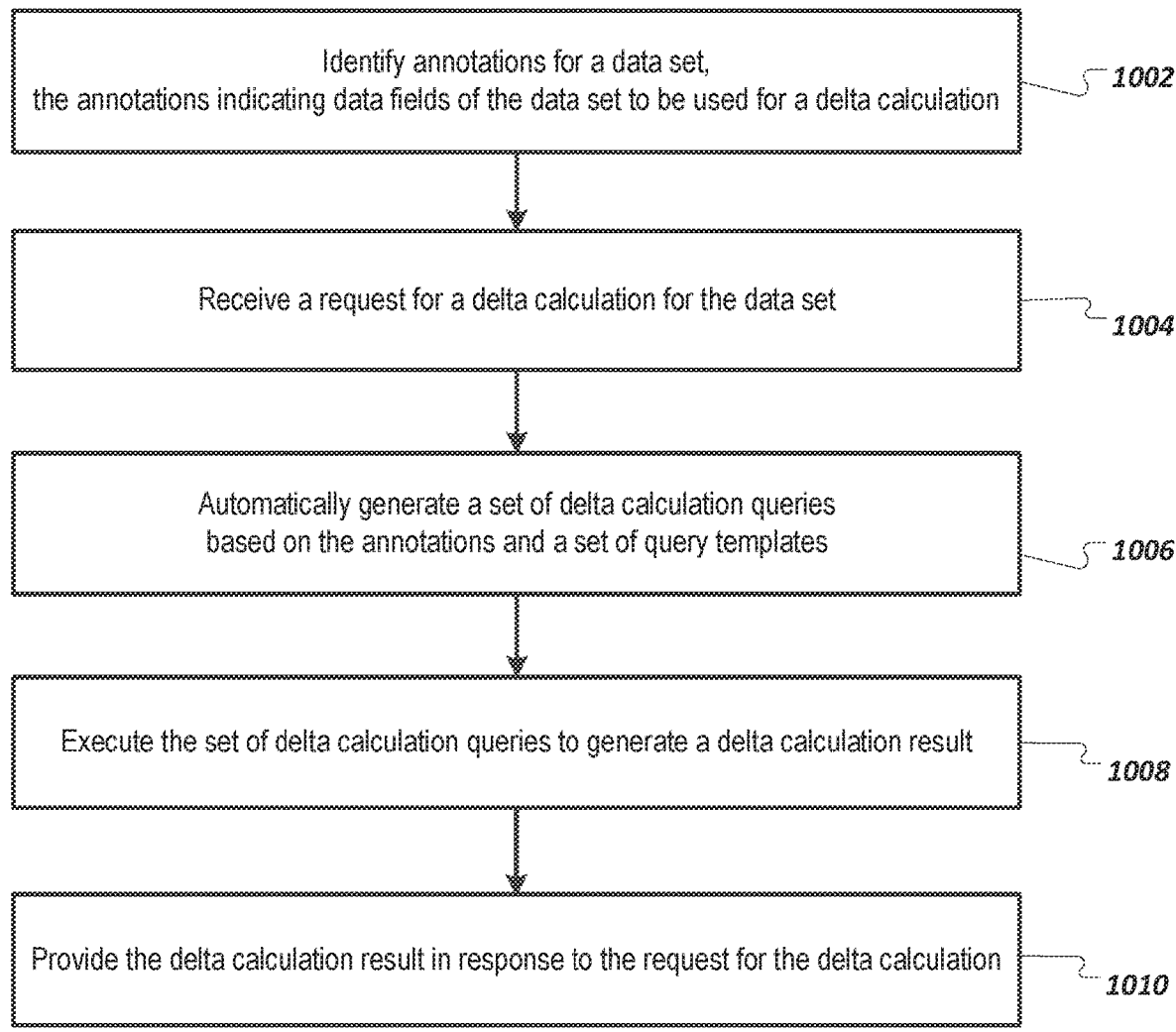
FIG. 10 is a flowchart of an example method for automatically providing delta query support for backend databases.

FIG. 10 is a flowchart of an example method 1000 for automatically providing delta query support for backend databases. For clarity of presentation, the description that follows generally describes method 1000 and related methods in the context of FIG. 1. However, it will be understood that method 1000 and related methods may be performed, for example, by any other suitable system, environment, software, and hardware, or a combination of systems, environments, software, and hardware, as appropriate. For example, one or more of the mobile platform server 104, the data producer 106, or other computing device (not illustrated) can be used to execute method 1000 and related methods and obtain any data from the memory of the client, the mobile platform server 104, the data producer 106, or the other computing device (not illustrated).

At 1002, annotations for a data set are identified. The data set can be, for example, a data view, a data table, or some other type of data set. The annotations can indicate data fields of the data set to be used for a delta calculation. The annotations can indicate data fields that respectively include, for a given record of the data set, a creation time, a changed time, and a deletion indicator.

At 1004, a request is received for a delta calculation for the data set. The request can be received, for example, from a mobile device that is now online after being in an offline mode. The request for the delta calculation can include a delta token. The delta token can be, for example, a timestamp. The delta token can indicate a time at which a previous delta calculation was performed for the data set (e.g., for the mobile device).

At 1006, a set of delta calculation queries are automatically generated based on the annotations and a set of query templates in response to the request for the delta calculation. The query templates can include, for example, placeholders that are populated with data field names that are associated the identified annotations.

At 1008, the automatically generated delta calculation queries in the set of delta calculation queries are executed to generate a delta calculation result. The delta calculation result can include data associated with records that have been added to, changed in, or deleted from the data set since a time represented by the delta token.

At 1010, the delta calculation result is provided in response to the request for the delta calculation. For example, the delta calculation can be provided to the mobile device that is now online after being in an offline mode.

Described implementations of the subject matter can include one or more features, alone or in combination.

For example, in a first implementation, a computer-implemented method includes: identifying annotations for a data set, the annotations indicating data fields of the data set to be used for a delta calculation; receiving a request for a delta calculation for the data set; automatically generating a set of delta calculation queries based on the annotations and a set of query templates in response to the request for the delta calculation; executing the set of delta calculation queries to generate a delta calculation result; and providing the automatically generated delta calculation result in response to the request for the delta calculation.

The foregoing and other described implementations can each optionally include one or more of the following features:

A first feature, combinable with any of the following features, wherein the annotations indicate data fields that respectively include, for a given record of the data set, a creation time, a changed time, and a deletion indicator.

A second feature, combinable with any of the previous or following features, wherein the request for the delta calculation includes a delta token.

A third feature, combinable with any of the previous or following features, wherein the delta token is a timestamp that indicates a time at which a previous delta calculation was performed for the data set.

A fourth feature, combinable with any of the previous or following features, wherein the delta calculation result includes data associated with records that have been added to, changed in, or deleted from the data set since a time represented by the delta token.

A fifth feature, combinable with any of the previous or following features, wherein the data set is a database view.

A sixth feature, combinable with any of the previous or following features, wherein the data set is a database table.

A sixth feature, combinable with any of the previous or following features, wherein a second set of delta calculation queries is automatically generated based on the same set of query templates and second, different annotations identified for a second, different data set.

In a second implementation, a non-transitory, computer-readable medium storing computer-readable instructions executable by a computer and configured to:

In a second implementation, a non-transitory, computer-readable medium storing computer-readable instructions executable by a computer is configured to: identify annotations for a data set, the annotations indicating data fields of the data set to be used for a delta calculation; receive a request for a delta calculation for the data set; automatically generate a set of delta calculation queries based on the annotations and a set of query templates in response to the request for the delta calculation; execute the set of delta calculation queries to generate a delta calculation result; and provide the automatically generated delta calculation result in response to the request for the delta calculation.

The foregoing and other described implementations can each optionally include one or more of the following features:

A first feature, combinable with any of the following features, wherein the annotations indicate data fields that respectively include, for a given record of the data set, a creation time, a changed time, and a deletion indicator.

A second feature, combinable with any of the previous or following features, wherein the request for the delta calculation includes a delta token.

A third feature, combinable with any of the previous or following features, wherein the delta token is a timestamp that indicates a time at which a previous delta calculation was performed for the data set.

A fourth feature, combinable with any of the previous or following features, wherein the delta calculation result includes data associated with records that have been added to, changed in, or deleted from the data set since a time represented by the delta token.

A fifth feature, combinable with any of the previous or following features, wherein the data set is a database view.

A sixth feature, combinable with any of the previous or following features, wherein the data set is a database table.

A sixth feature, combinable with any of the previous or following features, wherein a second set of delta calculation queries is automatically generated based on the same set of query templates and second, different annotations identified for a second, different data set.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, the method comprising:
   identifying annotations for a data set, wherein the annotations indicate which data fields of the data set are to be used for a delta calculation, and wherein the annotations include a creation-field annotation that specifies that a creation-indication field of the data set includes a creation time value, a changed-field annotation that specifies that a change-indication field of the data set includes an edit time value, and a deletion-field annotation that specifies that a deletion-indication field of the data set includes an is-deleted value that indicates whether a respective row has been deleted;
   receiving a request for a delta calculation for the data set;
   automatically generating a set of delta calculation queries based on the annotations and a set of query templates in response to the request for the delta calculation, including automatically generating a find-added-or-changed-records delta query for determining records that have been changed or added and not subsequently deleted from the data set, including automatically including the creation-indication field, the change-indication field, and the deletion-indication field in the find-added-or-changed records delta query based on evaluating the creation-field annotation, the changed-field annotation, and the deletion-field annotation, wherein the find-added-or-changed-records delta query includes a condition for the deletion-indication field to be false; and
   executing the set of delta calculation queries, including the find-added-or-changed-records delta query, to automatically generate a delta calculation result; and
   providing the automatically generated delta calculation result in response to the request for the delta calculation.

2. The method of claim 1, wherein the annotations indicate data fields that respectively include, for a given record of the data set, a creation time, a changed time, and a deletion indicator.

3. The method of claim 1, wherein the request for the delta calculation includes a delta token.

4. The method of claim 3, wherein the delta token is a timestamp that indicates a time at which a previous delta calculation was performed for the data set.

5. The method of claim 1, wherein the delta calculation result includes data associated with records that have been added to, changed in, or deleted from the data set since a time represented by the delta token.

6. The method of claim 1, wherein the data set is a database view.

7. The method of claim 1, wherein the data set is a database table.

8. The method of claim 1, further comprising automatically generating a second set of delta calculation queries based on the same set of query templates and second, different annotations identified for a second, different data set.

9. A system comprising:
   one or more computers associated with an enterprise portal; and
   a non-transitory computer-readable medium coupled to the one or more computers having instructions stored thereon which, when executed by the one or more computers, cause the one or more computers to perform operations comprising:
      identifying annotations for a data set, wherein the annotations indicate which data fields of the data set are to be used for a delta calculation, and wherein the annotations include a creation-field annotation that specifies that a creation-indication field of the data set includes a creation time value, a changed-field annotation that specifies that a change-indication field of the data set includes an edit time value, and a deletion-field annotation that specifies that a deletion-indication field of the data set includes an is-deleted value that indicates whether a respective row has been deleted;
      receiving a request for a delta calculation for the data set;
      automatically generating a set of delta calculation queries based on the annotations and a set of query templates in response to the request for the delta calculation, including automatically generating a find-added-or-changed-records delta query for determining records that have been changed or added and not subsequently deleted from the data set, including automatically including the creation-indication field, the change-indication field, and the deletion-indication field in the find-added-or-changed records delta query based on evaluating the creation-field annotation, the changed-field annotation, and the deletion-field annotation, wherein the find-added-or-changed-records delta query includes a condition for the deletion-indication field to be false; and
      executing the set of delta calculation queries, including the find-added-or-changed-records delta query, to automatically generate a delta calculation result; and
      providing the automatically generated delta calculation result in response to the request for the delta calculation.

10. The system of claim 9, wherein the annotations indicate data fields that respectively include, for a given record of the data set, a creation time, a changed time, and a deletion indicator.

11. The system of claim 9, wherein the request for the delta calculation includes a delta token.

12. The system of claim 11, wherein the delta token is a timestamp that indicates a time at which a previous delta calculation was performed for the data set.

13. The system of claim 9, wherein the delta calculation result includes data associated with records that have been added to, changed in, or deleted from the data set since a time represented by the delta token.

14. The system of claim 9, the operations further comprising automatically generating a second set of delta calculation queries based on the same set of query templates and second, different annotations identified for a second, different data set.

15. A computer program product encoded on a non-transitory storage medium, the product comprising non-transitory, computer readable instructions for causing one or more processors to perform operations comprising:
identifying annotations for a data set, wherein the annotations indicate which data fields of the data set are to be used for a delta calculation, and wherein the annotations include a creation-field annotation that specifies that a creation-indication field of the data set includes a creation time value, a changed-field annotation that specifies that a change-indication field of the data set includes an edit time value, and a deletion-field annotation that specifies that a deletion-indication field of the data set includes an is-deleted value that indicates whether a respective row has been deleted;
receiving a request for a delta calculation for the data set;
automatically generating a set of delta calculation queries based on the annotations and a set of query templates in response to the request for the delta calculation, including automatically generating a find-deleted-records delta query for determining records that have been deleted from data set, including automatically including the deletion-indication field in the find-deleted-records delta query based on evaluating the deletion-field annotation, wherein the find-deleted-records delta query includes a condition for the deletion-indication field to be true; and
executing the set of delta calculation queries, including the find-added-or-changed-records delta query and the find-deleted-records delta query, to automatically generate a delta calculation result; and
providing the automatically generated delta calculation result in response to the request for the delta calculation.

16. The computer program product of claim 15, wherein the annotations indicate data fields that respectively include, for a given record of the data set, a creation time, a changed time, and a deletion indicator.

17. The computer program product of claim 15, wherein the request for the delta calculation includes a delta token.

18. The computer program product of claim 17, wherein the delta token is a timestamp that indicates a time at which a previous delta calculation was performed for the data set.

19. The computer program product of claim 15, wherein the delta calculation result includes data associated with records that have been added to, changed in, or deleted from the data set since a time represented by the delta token.

20. The computer program product of claim 15, the operations further comprising automatically generating a second set of delta calculation queries based on the same set of query templates and second, different annotations identified for a second, different data set.

* * * * *